(12) United States Patent
Lee et al.

(10) Patent No.: US 12,200,403 B2
(45) Date of Patent: Jan. 14, 2025

(54) METHOD AND SYSTEM FOR VIRTUAL FITTING BASED ON VIDEO MEETING PROGRAM

(71) Applicant: NHN Corporation, Gyeonggi-do (KR)

(72) Inventors: Rok Kyu Lee, Gyeonggi-do (KR); Hyug Jae Lee, Gyeonggi-do (KR); Ha Eun Ahn, Gyeonggi-do (KR); Byum Hyuk Koo, Gyeonggi-do (KR)

(73) Assignee: NHN CORPORATION, Gyeonggi-Do (KR)

( * ) Notice: Subject to any disclaimer, the term of this patent is extended or adjusted under 35 U.S.C. 154(b) by 140 days.

(21) Appl. No.: 17/992,753

(22) Filed: Nov. 22, 2022

(65) Prior Publication Data
US 2023/0164297 A1  May 25, 2023

(30) Foreign Application Priority Data
Nov. 23, 2021  (KR) .................. 10-2021-0162203

(51) Int. Cl.
*H04N 7/15* (2006.01)
*H04N 7/14* (2006.01)

(52) U.S. Cl.
CPC ............. *H04N 7/157* (2013.01); *H04N 7/147* (2013.01)

(58) Field of Classification Search
CPC .................. H04N 7/157; H04N 7/147
See application file for complete search history.

(56) References Cited

U.S. PATENT DOCUMENTS

| 7,564,476 B1 * | 7/2009 | Coughlan .............. H04N 7/147 |
| | | 348/14.08 |
| 10,904,488 B1 * | 1/2021 | Weisz .................. G06V 10/774 |

(Continued)

FOREIGN PATENT DOCUMENTS

| KR | 10-2020-0037241 | 4/2020 |
| KR | 10-2020-0092265 | 8/2020 |

(Continued)

OTHER PUBLICATIONS

Office Action dated Oct. 21, 2022 for Korean Patent Application No. 10-2021-0162203 and its English translation by Google Translate.

*Primary Examiner* — Amal S Zenati
(74) *Attorney, Agent, or Firm* — Womble Bond Dickinson (US) LLP

(57) ABSTRACT

A method for virtual fitting based on a video meeting program includes: acquiring a other-participant picture of another user attending a video meeting; acquiring a garment characteristic parameter value specifying the shape of a garment that another user in the acquired other-participant picture wears; determining a clothing category, into which the garment that another user wears is classified, based on the garment characteristic parameter value; determining a dress code for the video meeting based on the clothing category; detecting a candidate fitting garment based on the dress code and the garment characteristic parameter value; determining a virtual fitting garment that is a garment image intended to be virtually put on a user attending the video image based on the candidate fitting garment; creating a virtual fitting picture in which the user in a main-participant picture of the user virtually wears the virtual fitting garment; and providing the virtual fitting picture.

11 Claims, 10 Drawing Sheets

(56) References Cited

U.S. PATENT DOCUMENTS

2017/0302709 A1* 10/2017 Jones ................. G06Q 10/10
2021/0142539 A1* 5/2021 Ayush ................. G06N 3/08

FOREIGN PATENT DOCUMENTS

KR  10-2020-0141251   12/2020
KR  10-2021-0083551    7/2021

* cited by examiner

[FIG. 1]
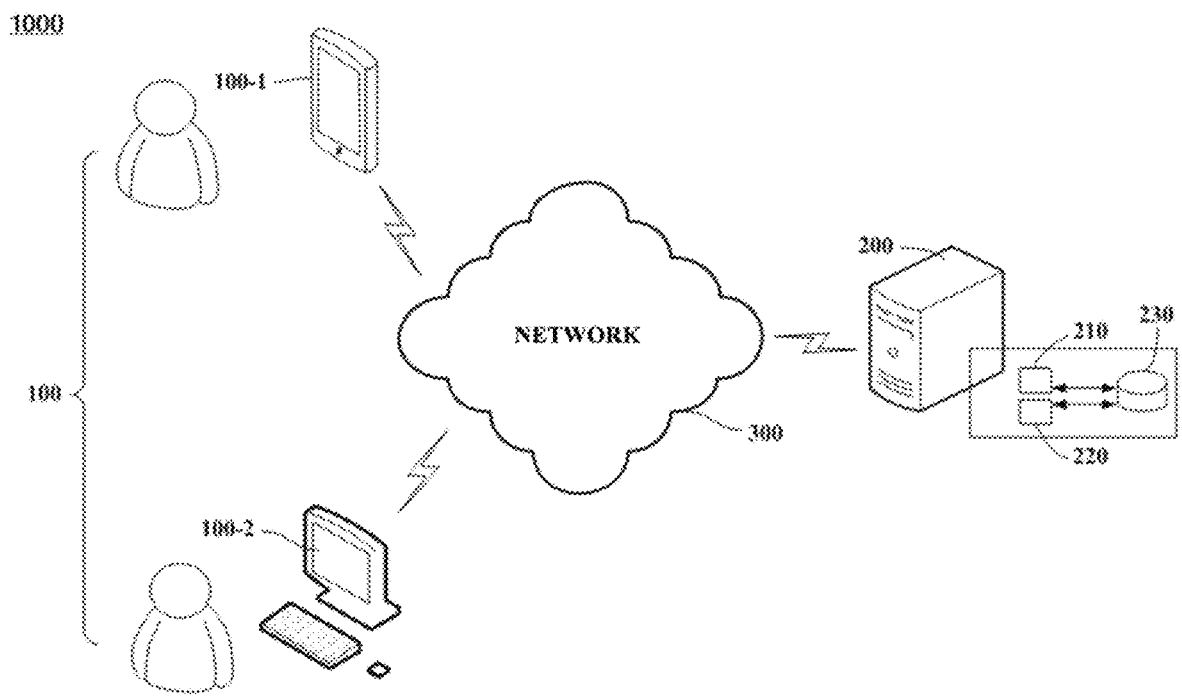

[FIG. 2]
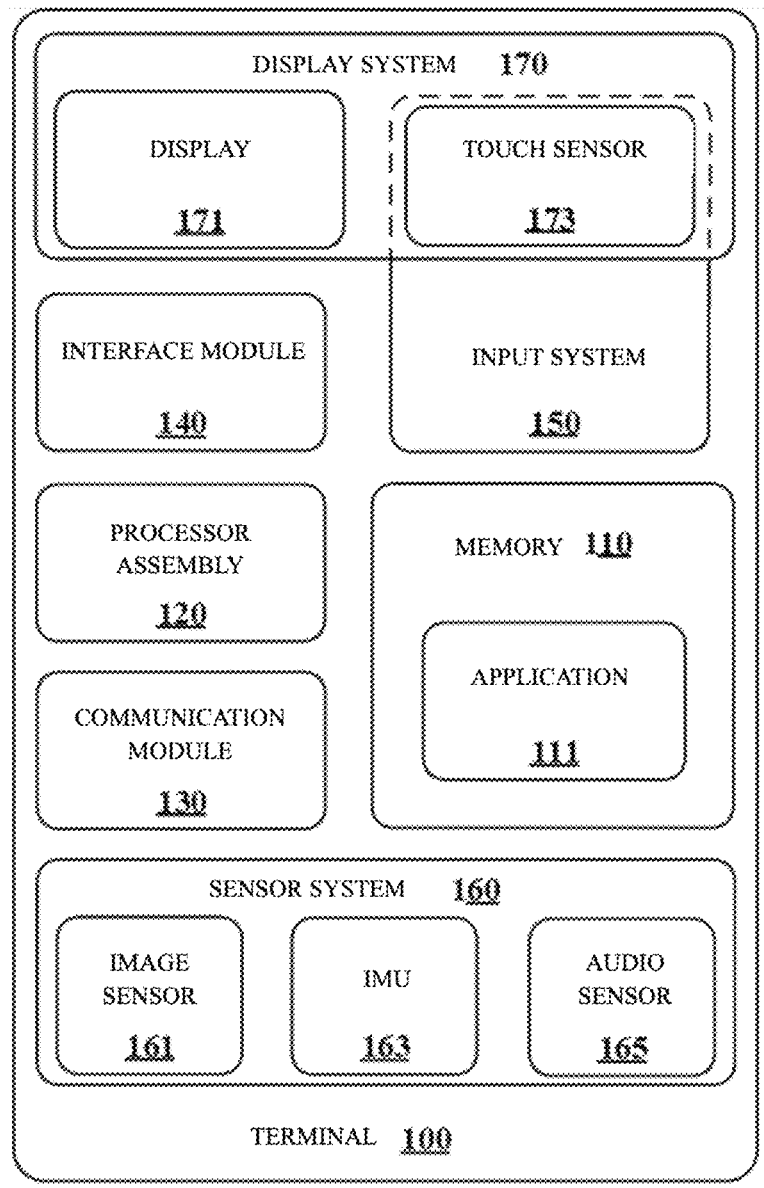

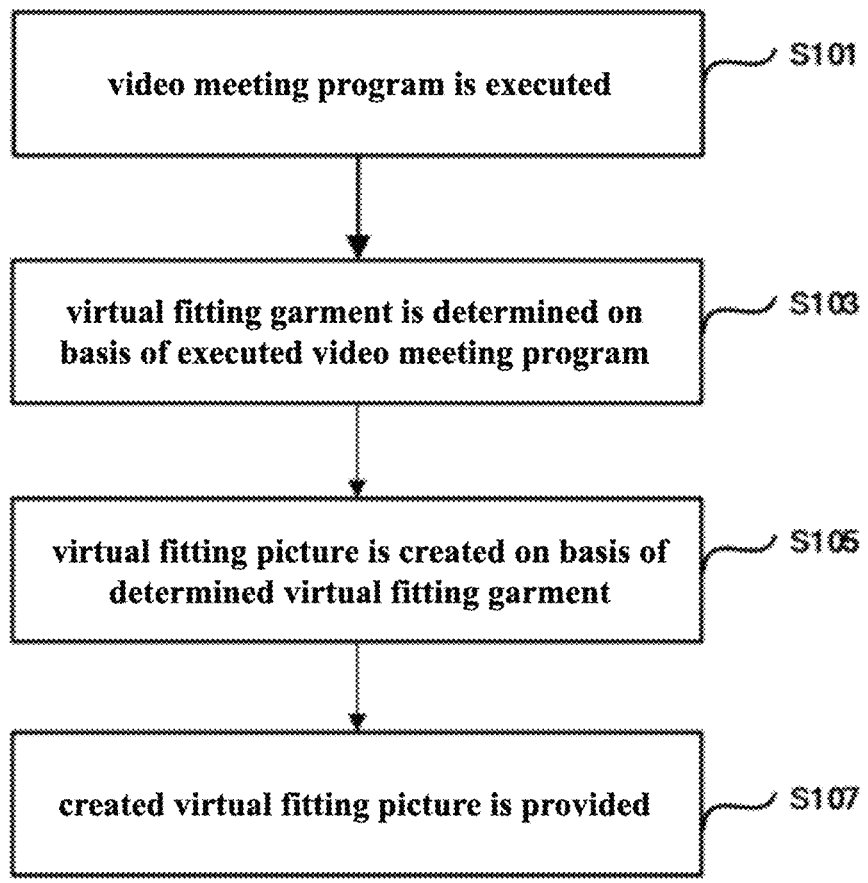

[FIG. 4]
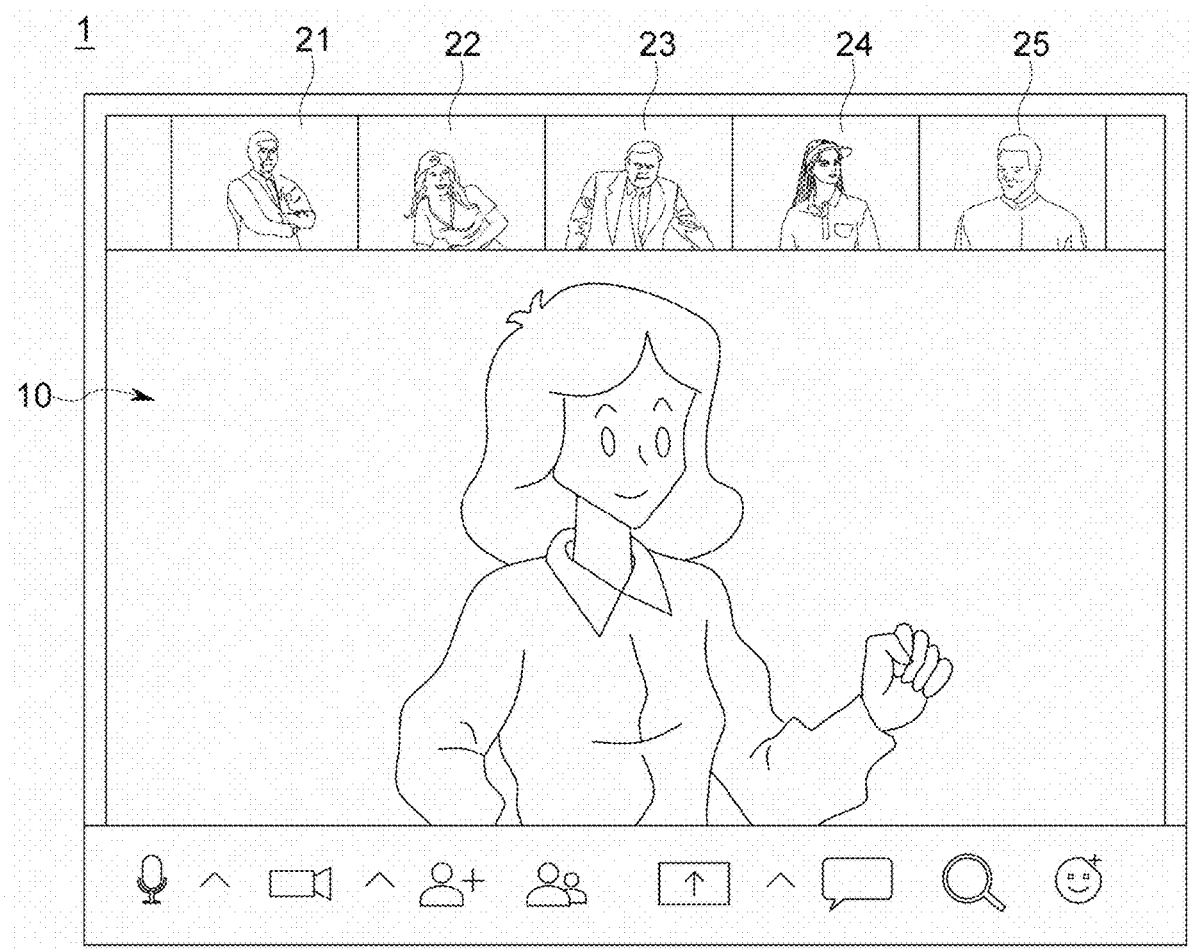

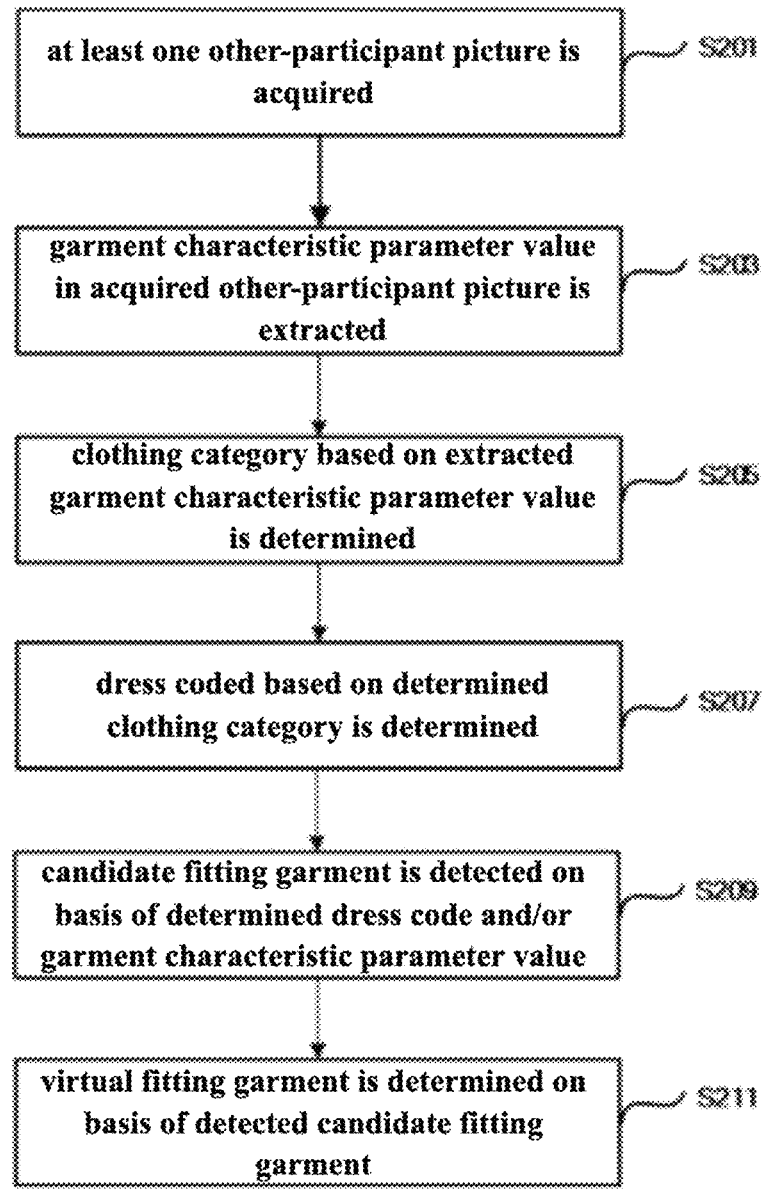

[FIG. 6]
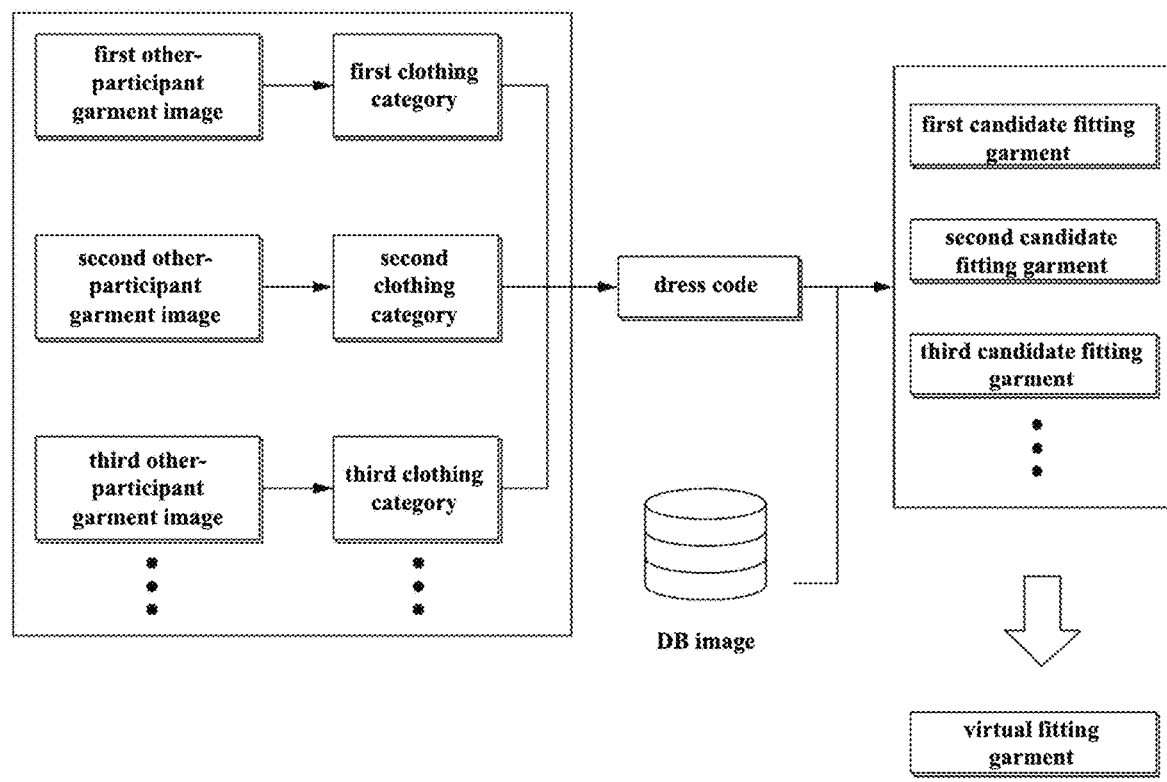

[FIG. 7]
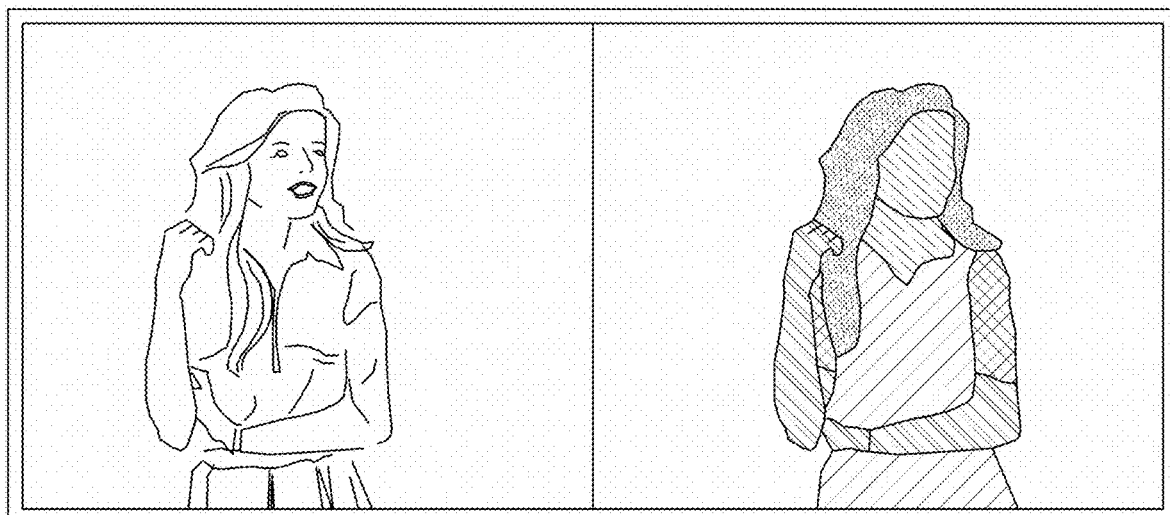
<Human parsing>

[FIG. 8]
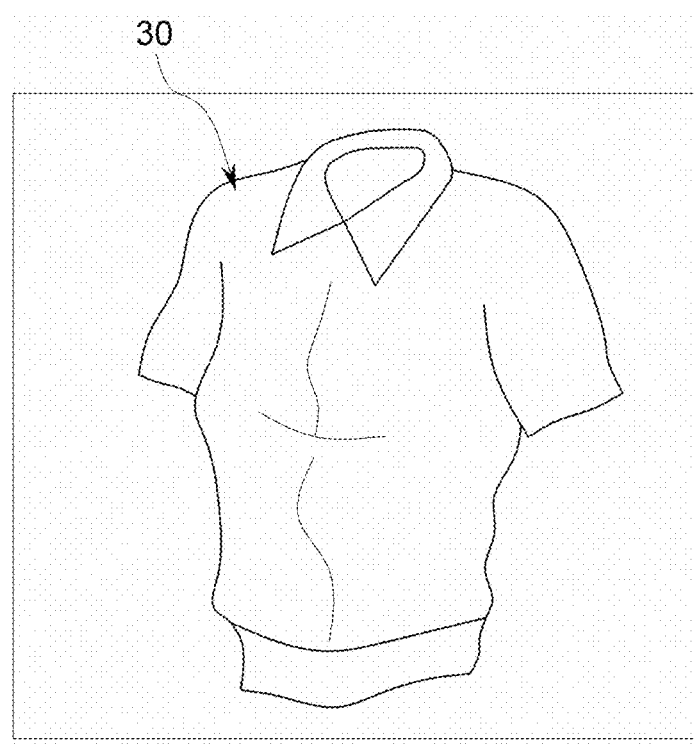

[FIG. 9]
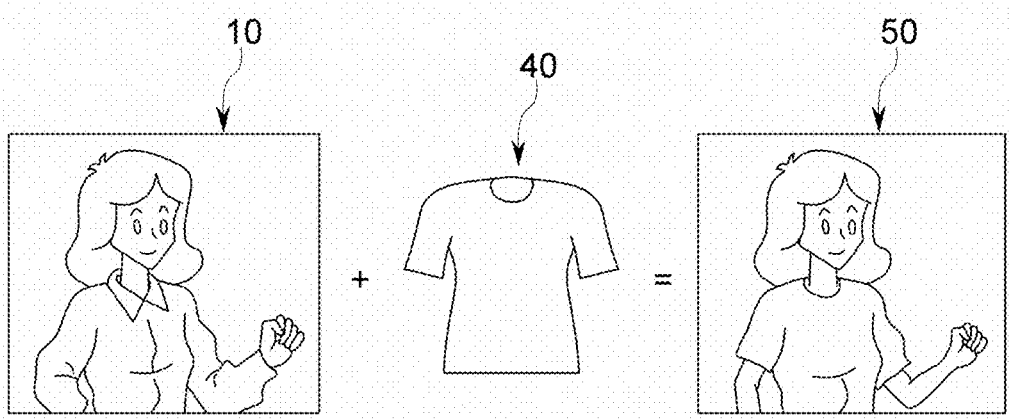

[FIG. 10]
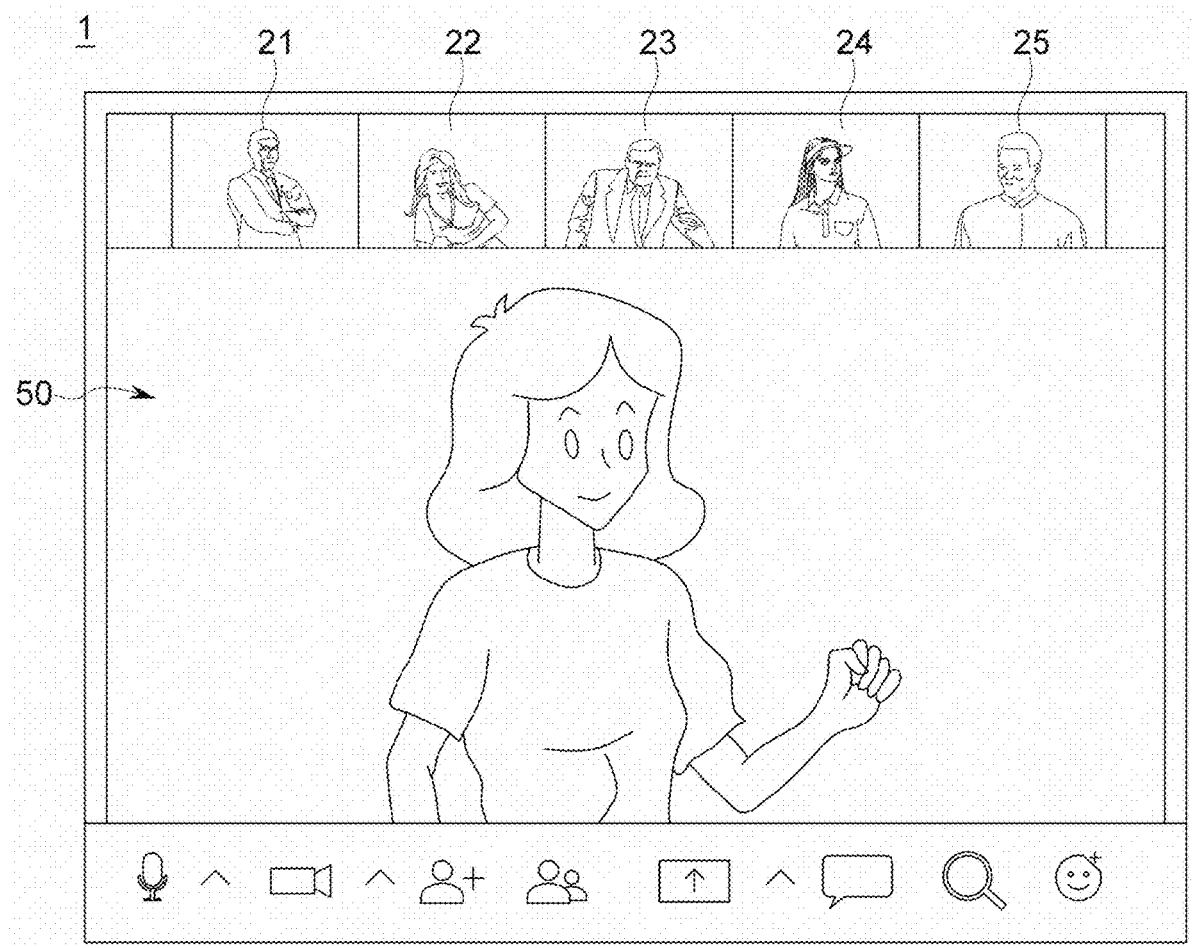

METHOD AND SYSTEM FOR VIRTUAL FITTING BASED ON VIDEO MEETING PROGRAM

CROSS REFERENCE TO RELATED APPLICATION

This application claims priority from and benefits of Korean Patent Application No. 10-2021-0162203, filed on Nov. 23, 2021, which are hereby incorporated by reference for all purposes as if fully set forth herein.

BACKGROUND OF INVENTION

Field of the Invention

The present disclosure relates to a method and system for virtual fitting based on a video meeting program. In more detail, the present disclosure relates to a method and system for virtual fitting based on a video meeting program, the method and system performing a virtual fitting process on the basis of clothing that at least one user attending a video meeting wears.

Related Art

For a long period of time, video meeting systems have enabled real-time video communication between participants at different places.

Accordingly, a participant at one place is enabled to check in real time audio, video, etc. of other participants who talk even at remote places.

The fact that it is possible to see other participants at remote places on the basis of video communication enables more productive communication because it provides facial expressions, gestures, or other visual information that participants cannot see through a voice call.

With the development of such video meeting systems, recently, more people are working from home and people increasingly prefer non-contact type processes due to the spread of viruses such as COVID-19 (Coronavirus disease-2019), development of Information and Communications Technology (ICT), etc.

Accordingly, remote communication of a non-contact type using video meeting systems described above is being actively used.

Participants of a video meeting that is performed through such video meeting systems described above share their pictures for better communication therebetween.

Participants are asked to wear suitable clothes when they share pictures, as described above, depending on the characteristic, the atmosphere, etc. of the video meeting.

However, people complain about the inconvenience of changing in order to attend a video meeting in the middle of working from home in comfortable attire or having to wear different suitable clothes, depending on the characteristic or the atmosphere of the video meetings that they attend.

Further, when participants are not notified, in advance, of the characteristic, the atmosphere, etc. of a specific video meeting that they are supposed to attend, or do not have information about the dress code that other participants generally use, they have difficulty in deciding their clothing style, so there is a problem that a video meeting system is not used much.

Therefore, it is required to develop and introduce a new technology for solving the problems described above.

PRIOR ART DOCUMENT

Patent Document (Patent Document 1) KR 10-2021-0083551 A

SUMMARY

An objective of the present disclosure is to provide a method and system for virtual fitting based on a video meeting program, the method and system performing a virtual fitting process on the basis of clothing that at least one user attending a video meeting wears.

In detail, an objective of the present disclosure is to provide a method and system for virtual fitting based on a video meeting program, the method and system acquiring a virtual garment image on the basis of the clothing, which at least one other user attending a video meeting wears, and virtually putting the acquired virtual garment image on a user attending the video meeting.

However, the objectives to be achieved by the present disclosure and embodiments of the present disclosure are not limited to the objectives described above and there may be other objectives.

A method for virtual fitting based on a video meeting program according to an embodiment of the present disclosure is a method in which a fitting application that is executed by at least one processor of a terminal performs virtual fitting based on a video meeting program. The method includes: acquiring at least one other-participant picture of another user attending the video meeting; acquiring a garment characteristic parameter value specifying the shape of a garment that the another user in the acquired other-participant picture wears; determining a clothing category, into which the garment that the another user wears is classified, on the basis of the acquired garment characteristic parameter value; determining a dress code for the video meeting on the basis of the determined clothing category; detecting at least one candidate fitting garment on the basis of the determined dress code and the garment characteristic parameter value; determining a virtual fitting garment that is a garment image that is intended to be virtually put on a user attending the video image on the basis of the detected candidate fitting garment; creating a virtual fitting picture in which the user in a main-participant picture of the user virtually wears the determined virtual fitting garment; and providing the created virtual fitting picture.

The garment characteristic parameter value includes a data value of each of garment characteristic parameters including at least one of a color, the kind of a pattern, the kind of a neckline, and a sleeve length of a predetermined garment.

The determining of a dress code includes determining the dress code on the basis of an appearance frequency of each of at least one clothing category.

The detecting of a candidate fitting garment includes detecting at least one garment image of a plurality of garment images, which is classified and stored as a clothing category matched with the dress code, as the candidate fitting garment.

The detecting of a candidate fitting garment includes: creating an integrated characteristic parameter value integrating the most appearing data values of the garment characteristic parameters, respectively, in the at least one garment characteristic parameter value; comparing the created integrated characteristic parameter value with garment characteristic parameter values of a plurality of garment images stored in advance in a database, respectively; and detecting at least one garment image having a garment characteristic parameter value satisfying a predetermined coincidence ratio to the integrated characteristic parameter value as the candidate fitting garment.

The detecting of a candidate fitting garment includes detecting at least one garment image, which has a garment characteristic parameter value satisfying a predetermined coincidence ratio to the integrated characteristic parameter value of a plurality of garment images classified and stored as a clothing category matched with the dress code, as the candidate fitting garment.

The determining of a virtual fitting garment includes determining the virtual fitting garment on the basis of user input of selecting any one of the at least one candidate fitting garment.

The determining of a virtual fitting garment further includes: providing a parameter adjustment interface that changes the garment characteristic parameter value of a candidate fitting garment selected on the basis of the user input; changing the garment characteristic parameter value of the selected candidate fitting garment on the basis of user input based on the provided parameter adjustment interface; and determining the candidate fitting garment having the changed garment characteristic parameter value as the virtual fitting garment.

The determining of a virtual fitting garment includes determining a candidate fitting garment, which has a garment characteristic parameter value having a highest coincidence ratio to the integrated characteristic parameter value of the at least one candidate fitting garment, as the virtual fitting garment.

The determining of a virtual fitting garment includes determining a candidate fitting garment, in which a virtual wearing computing amount including at least one of a data processing amount and a data processing time when the virtual wearing is performed is minimum, of the at least one candidate fitting garment as the virtual fitting garment.

The providing of the created virtual fitting picture includes providing the virtual fitting picture to terminals of at least one other user attending the video meeting and the user by transmitting the virtual fitting picture through the video meeting program.

Meanwhile, a system for virtual fitting based on a video meeting program according to an embodiment of the present disclosure includes: at least one or more displays outputting a virtual fitting picture; at least one or more memories; and at least one or more processors, wherein at least one application that is at least one application stored in the memory and performing virtual fitting based on a video meeting program by being executed by the processor acquires at least one other-participant picture of another user attending the video meeting, acquires a garment characteristic parameter value specifying the shape of a garment that the another user in the acquired other-participant picture wears, determines a clothing category, into which the garment that the another user wears is classified, on the basis of the acquired garment characteristic parameter value, determines a dress code for the video meeting on the basis of the determined clothing category, detects at least one candidate fitting garment on the basis of the determined dress code and the garment characteristic parameter value, determines a virtual fitting garment that is a garment image that is intended to be virtually put on a user attending the video image on the basis of the detected candidate fitting garment, creates the virtual fitting picture in which the user in a main-participant picture of the user virtually wears the determined virtual fitting garment, and provides the created virtual fitting picture.

The method and system for virtual fitting based on a video meeting program according to an embodiment of the present disclosure detect a virtual garment image corresponding to the clothing, which at least one other user attending a video meeting wears, and virtually putting the detected virtual garment image on a user attending the video meeting, whereby there is an effect that it is possible to provide a picture of the user wearing clothing, which satisfies a dress code suitable for the characteristic or the atmosphere of the video meeting, through the video meeting program.

Further, the method and system for virtual fitting based on a video meeting program according to an embodiment of the present disclosure find out a dress code for a video meeting on the basis of the clothing of at least one other user attending the video meeting, and then automatically virtually puts virtual clothing corresponding to the dress code on a user, whereby there is an effect that it is possible to minimize the inconvenience that the user has to change for the video meeting in the middle of working from home in comfortable dress or the user has to wear different suitable clothes, depending on the characteristic or the atmosphere of the video meeting that he/she attends.

Further, the method and system for virtual fitting based on a video meeting program according to an embodiment of the present disclosure determine a dress code of a video meeting on the basis of the clothing that at least one other user attending the video meeting wears, and virtually puts virtual clothing that satisfies the determined dress code on a user, whereby there is an effect that it is possible to reduce the time or costs that a user who intends to attend a video meeting uses to determine his/her clothing style and it is possible to increase usability of a video meeting program.

However, effects that can be obtained in the present disclosure are not limited to the effects stated above, and other effects not stated can be clearly understood from the following description.

BRIEF DESCRIPTION OF THE DRAWINGS

FIG. 1 is a conceptual diagram of a system for virtual fitting based on a video meeting program according to an embodiment of the present disclosure.

FIG. 2 is a block diagram showing the inside of a terminal according to an embodiment of the present disclosure.

FIG. 3 is a flowchart illustrating a method of virtual fitting based on a video meeting program according to an embodiment of the present disclosure.

FIG. 4 is an example showing a video meeting interface according to an embodiment of the present disclosure.

FIG. 5 is a flowchart illustrating a method of determining a virtual fitting garment according to an embodiment of the present disclosure.

FIG. 6 is a conceptual diagram illustrating the method of determining a virtual fitting garment according to an embodiment of the present disclosure.

FIG. 7 is an exemplary diagram illustrating human parsing according to an embodiment of the present disclosure.

FIG. 8 is a diagram showing an example of an other-participant garment image according to an embodiment of the present disclosure.

FIG. 9 is an exemplary diagram illustrating a method of a virtual fitting picture according to an embodiment of the present disclosure.

FIG. 10 is a diagram showing an example of providing a virtual fitting picture according to an embodiment of the present disclosure on the basis of a video meeting interface.

DESCRIPTION OF EXEMPLARY EMBODIMENTS

FIG. 1 is a conceptual diagram of a system for virtual fitting based on a video meeting program according to an embodiment of the present disclosure.

Referring to FIG. 1, a system 1000 for virtual fitting based on a video meeting program according to an embodiment of the present disclosure can provide a video meeting-based virtual fitting service that performs a virtual fitting process on the basis of the clothing that at least one user attending a video meeting wears.

The video meeting program according to an embodiment may mean a system that supports communication between remote users using voices, characters, images, and/or pictures on the basis of communication between terminals at remote places.

In an embodiment, the system 1000 for virtual fitting based on a video meeting program that provides the video meeting-based virtual fitting service described above may include a terminal 100, a virtual fitting server 200, and a network 300.

The terminal 100 and the virtual fitting server 200 may be connected to each other through the network 300.

The network 300 according to an embodiment means a connection structure enabling information exchange among nodes such as the terminal 100 and/or the virtual fitting server 200. For example, the network 300 may include a 3GPP (3rd Generation Partnership Project) network, an LTE (Long Term Evolution) network, a WIMAX (World Interoperability for Microwave Access) network, the internet, a LAN (Local Area Network), a Wireless LAN (Wireless Local Area Network), a WAN (Wide Area Network), a PAN (Personal Area Network), a Bluetooth network, a satellite broadcasting network, an analog broadcasting network, a DMB (Digital Multimedia Broadcasting) network, etc., but is not limited thereto.

Hereafter, the terminal 100 and the virtual fitting server 200 that implement the system 1000 for virtual fitting based on a video meeting program are described in detail with reference to the accompanying drawings.

Terminal (100)

The terminal 100 according to an embodiment of the present disclosure may be a predetermined computing device in which a fitting application that provides a video meeting-based virtual fitting service is installed.

In detail, in terms of hardware, the terminal 100 may include a mobile type computing device 100-1 and/or a desktop type computing device 100-2 in which a fitting application is installed.

The mobile type computing device 100-1 may be a mobile device in which a fitting application is installed such as a smart phone or a tablet PC.

For example, the mobile type computing device 100-1 may include a smart phone, a mobile phone, a device for digital broadcasting, a personal digital assistant (PDA), a portable multimedia player (PMP), a tablet PC, etc.

The desktop type computing device 100-2 may include devices in which a program for executing a video meeting-based virtual fitting service on the basis of wired/wireless communication, for example, personal computers such as a fixed type desktop PC and a laptop computer in which a fitting application is installed.

Depending on the embodiments, the terminal 100 may further include a predetermined server computing device that provides a video meeting-based virtual fitting service environment.

FIG. 2 is a block diagram showing the inside of the terminal 100 according to an embodiment of the present disclosure.

Meanwhile, referring to FIG. 2, in terms of function, the terminal 100 may include a memory 110, a processor assembly 120, a communication module 130, an interface module 140, an input system 150, a sensor system 160, and a display system 170. These components may be configured to be included in the housing of the terminal 100.

In detail, a fitting application 111 is stored in the memory 110 and the fitting application 110 may store any one or more of various application programs, data, and commands for providing a video meeting-based virtual fitting service environment.

That is, the memory 110 can store instructions, data, etc. that can be used to create a video meeting-based virtual fitting service environment.

The memory 110 may include a program section and a data section.

The program section according to an embodiment may be associated with an operation system (OS), which boots the terminal 100, and functional elements therebetween, and data that are created by use of the terminal 100 may be stored in the data section.

The memory 110 may include at least one or more non-transitory computer-readable storage media and transitory computer-readable media.

For example, the memory 110 may be various storage devices such as a ROM, an EPROM, a flash drive, and a hard drive, and may include a web storage that performs the storage function of the memory 110 on the internet.

The processor assembly 120 may include at least one or more processors, which can execute the instructions of the fitting application 111 stored in the memory 110, in order to perform various types of work for creating a video meeting-based virtual fitting service environment.

In an embodiment, the processor assembly 120 can control general operation of components through the fitting application 111 of the memory 110 to provide a video meeting-based virtual fitting service environment.

The processor assembly 120 may be a System on Chip (SOC) that is suitable for a terminal 100 including a central processing unit (CPU) and/or a graphic processing unit (GPU), and can execute the operating system (OS) and/or the application program stored in the memory 110 and can control the components mounted in the terminal 100.

The processor assembly 120 can perform communication internally with the components using a system bus and may include one or more predetermined bus structures including a local bus.

The processor assembly 120 may implemented by including at least one of application specific integrated circuits (ASICs), digital signal processors (DSPs), digital signal processing devices (DSPDs), programmable logic devices (PLDs), field programmable gate arrays (FPGAs), controllers, micro-controllers, microprocessors, and electric units for performing other functions.

The communication module 130 may include one or more devices for communication with external devices. The communication module 130 can perform communication through a wireless network.

In detail, the communication module 130 can communicate with the terminal 100 storing a content source for implementing a video meeting-based virtual fitting service environment, and can communicate with various user input components such as a controller that receives user input.

In an embodiment, the communication module 130 can transmit/receive various data related to a video meeting-based virtual fitting service environment to/from another terminal 100 and/or an external server.

The communication module 130 can transmit/receive data to/from at least one of a base station, an external terminal 100, and a certain server on a mobile communication network constructed by communication devices that can perform technological standards or communication methods for mobile communication (e.g., Long Term Evolution (LTE), Long Term Evolution-Advanced (LTE-A), 5G New Radio (NR), and WIFI), or a near field communication method.

The sensor system 160 may include various sensors such as an image sensor 161, a position sensor 163 (IMU), an audio sensor 165, a distance sensor, a proximity sensor, and a contact sensor.

The image sensor 161 can capture images and/or pictures of a physical space around the terminal 100.

In an embodiment, the image sensor 161 can take and acquire pictures (e.g., a user picture, etc.) related to a video meeting-based virtual fitting service environment.

The image sensor 161 can be disposed on the front and/or the rear of the terminal 100 and can acquire pictures by filming the side in the disposition direction, and can film a physical space through a camera disposed to face the outside on the terminal 100.

The image sensor 161 may include an image sensor device and a picture processing module. In detail, the image sensor 161 can process still pictures or moving pictures that are obtained by an image sensor device (e.g., a CMOS or a CCD).

The image sensor 161 can extract necessary information by processing still pictures or moving pictures acquired through an image sensor device using a picture processing module, and can transmit the extracted information to a processor.

The image sensor 161 may be a camera assembly including at least one or more cameras. The camera assembly may include a common camera that takes images in the visible light band, and may further include a special camera such as an infrared camera and a stereo camera.

The image sensor 161, depending on embodiments, may be included and operated in the terminal 100 or may be included in an external device (e.g., an external server, etc.) and operated through cooperation based on the communication module 130 and/or the interface module 140 described above.

The position sensor (IMU) 163 can sense at least one or more of movement and acceleration of the terminal 100. For example, the position sensor may be implemented by a combination of various position sensors such as an accelerometer, a gyroscope, and a magnetometer.

The position sensor (IMU) 163 can recognize space information about a physical space around the terminal 100 in cooperation with a position communication module 130 such as a GPS of the communication module 130.

The audio sensor 165 can recognize sounds around the terminal 100.

In detail, the audio sensor 165 may include a microphone that can sense voice input of a user who uses the terminal 100.

In an embodiment, the audio sensor 165 can receive voice data for a video meeting-based virtual fitting service that are input by a user.

The interface module 140 can connect the terminal 100 to one or more other devices such that communication is possible. In detail, the interface module 140 may include a wired and/or wireless communication device that is compatible with one or more different communication protocols.

The terminal 100 can be connected to several I/O devices through the interface module 140.

For example, the interface module 140 is connected t an audio output device, such as a headset port or a speaker, thereby being able to output audio.

It was exemplified in the above description that an audio output device is connected through the interface module 140, but an embodiment in which an audio output device is installed in the terminal 100 may also be included.

For example, the interface module 140 can be connected to an input device such as a keyboard and/or a mouse, thereby being able to acquire user input.

It was exemplified in the above description that a keyboard and/or a mouse is connected through the interface module 140, but an embodiment in which a keyboard and/or a mouse is installed in the terminal 100 may also be included.

The interface module 140 may include at least one of a wired/wireless headset port, an external charger port, a wire/wireless data port, a memory card port, a port connecting a device equipped with an identification module, an audio I/O (Input/Output) port, a video I/O (Input/Output) port, an earphone port a power amplifier, an RF circuit, a transceiver, and other communication circuits.

The input system 150 can sense user input (e.g., a gesture, a voice instruction, operation of a button, or other types of input) related to a video meeting-based virtual fitting service environment.

In detail, the input system 150 may include a predetermined button, a predetermined touch sensor, and/or the image sensor 161 that receives user motion input.

The input system 150 is connected to an external controller through the interface module 140, thereby being able to receive user input.

The display system 170 can output various items of information, which are related to a video meeting-based virtual fitting service, into graphic images.

As an embodiment, the display system 170 can display a video meeting interface, a main-participant picture, an other-participant picture, and/or virtual fitting pictures.

Such a display may include at least one of a liquid crystal display (LCD), a thin film transistor-liquid crystal display (TFT LCD), an organic light-emitting diode (OLED), a flexible display, a 3D display, and an e-ink display.

The components described above may be disposed in the housing of the terminal 100, and a user interface may include a touch sensor 173 disposed on a display 171 configured to receive user touch input.

In detail, the display system 170 may include a display 171 that outputs images and a touch sensor 173 that senses touch input by a user.

For example, the display 171 forms a mutual layer structure with the touch sensor 173 or is integrally formed with the touch sensor 173, thereby being able to be implemented as a touch screen. The touch screen can function as a user input unit that provides an input interface between the terminal 100 and a user, and simultaneously, can provide an output interface between the terminal 100 and a user.

Meanwhile, the terminal 100 according to an embodiment of the present disclosure can perform deep learning for a video meeting-based virtual fitting service in cooperation with a predetermined deep-learning neural network.

As an embodiment, the terminal 100 can perform human parsing of parsing a human region in a predetermined picture and/or a body coordinate information extraction process in a predetermined picture using the deep-learning neural network.

The deep-learning neural network according to an embodiment may include a Convolution Neural Network (CNN), Regions with CNN features (R-CNN), a Fast R-CNN, a Faster R-CNN, and/or Mask R-CNN, but is not limited thereto.

Depending on the embodiments, the terminal 100 may further perform at least some of the functional operations that are performed by the virtual fitting server 200 to be described below.

Virtual Fitting Server (200)

Meanwhile, the virtual fitting server 200 according to an embodiment of the present disclosure can perform a series of processes for providing a video meeting-based virtual fitting service.

In detail, in an embodiment, the virtual fitting server 200 can provide the video meeting-based virtual fitting service by exchanging data, which are required to drive a video meeting-based virtual fitting process in an external device such as the terminal 100, with the external device.

In more detail, in an embodiment, the virtual fitting server 200 can provide an environment in which the fitting application 111 can be operated in an external device (in an embodiment, the mobile type computing device 100-1 and/or a desktop type computing device 100-2).

To this end, the virtual fitting server 200 may include an application program, data, and/or command for operating the fitting application 111, and can transmit/receive data based on this configuration to/from the external device.

In an embodiment, the virtual fitting server 200 can execute a predetermined video meeting program.

In an embodiment, the virtual fitting server 200 can determine a virtual fitting garment based on the executed video meeting program.

The virtual fitting garment according to an embodiment may mean the image of a predetermined garment that is intended to be virtually put on a user in a picture of the user attending a video meeting through the video meeting program (in an embodiment, a main-participant picture).

In detail, the virtual fitting server 200 can determine the virtual fitting garment on the basis of the clothing that at least one other user attending in the video meeting wears.

In an embodiment, the virtual fitting server 200 can create a virtual fitting picture on the basis of the determined a virtual fitting garment.

The virtual fitting picture according to an embodiment may mean a picture when a user in a picture of users attending the video meeting (in an embodiment, a main-participant picture) wears the determined a virtual fitting garment.

In an embodiment, the virtual fitting server 200 can transmit and provide the created virtual fitting picture to an external computing device (as an embodiment, the terminal 100, etc.).

In an embodiment, the virtual fitting server 200 can perform deep learning for a video meeting-based virtual fitting service in cooperation with a predetermined deep-learning neural network.

As an embodiment, the virtual fitting server 200 can perform human parsing of parsing a human region in a predetermined picture and/or a body coordinate information extraction process in a predetermined picture using the deep-learning neural network.

In more detail, in an embodiment, the virtual fitting server 200 can read out a predetermined deep neural network driving program constructed to perform the deep learning, from the memory module 230, and can perform deep learning to be described below in accordance with the read-out predetermined deep neural network system.

The deep-learning neural network according to an embodiment may include a Convolution Neural Network (CNN), Regions with CNN features (R-CNN), a Fast R-CNN, a Faster R-CNN, and/or Mask R-CNN, but is not limited thereto.

Depending on embodiments, the deep-learning neural network described above may be directly included in the virtual fitting server 200, or may be implemented as a device and/or a server separate from the virtual fitting server 200 and may perform deep learning for the video meeting-based virtual fitting service.

In the following description, it is exemplified that the deep-learning neural network is included in the virtual fitting server 200, but the present disclosure is not limited thereto.

In an embodiment, the virtual fitting server 200 can store and manage various application programs, commands, and/or data for implementing a video meeting-based virtual fitting service.

As an embodiment, the virtual fitting server 200 can store and manage at least one or more video meeting interfaces, a main-participant picture, an other-participant picture, a virtual fitting picture, and/or a predetermined deep learning model.

Meanwhile, further referring to FIG. 1, in an embodiment, the virtual fitting server 200 described above may be implemented as a predetermined computing device including at least one or more processor modules 210 for data processing, at least one or more communication modules 220 for data exchange with an external device, and at least one or more memory modules 230 that store various application programs, data, and/or commands for providing a video meeting-based virtual fitting service.

The memory module 230 can store any one or more of an operating system (OS), various application programs, data, and commands for providing a video meeting-based virtual fitting service.

The memory module 230 may include a program section and a data section.

The program section according to an embodiment may be associated with an operation system (OS), which boots a server, and functional elements therebetween, and data that are created by use of the server may be stored in the data section.

In an embodiment, the memory module 230 may be various storage devices such as a ROM, a RAM, an EPROM, a flash drive, and a hard drive, and may be a web storage that performs the storage function of the memory module 230 on the internet.

The memory module 230 may be a recording medium that can be detachably connected to a server.

Meanwhile, the processor module 210 can control general operation of the units described above to implement a video meeting-based virtual fitting service.

The processor module 210 may be a System on Chip (SOC) that is suitable for a server including a central processing unit (CPU) and/or a graphic processing unit (GPU), and can execute the operating system (OS) and/or the application program stored in the memory module 230 and can control the components mounted in the server.

The processor module 210 can perform communication internally with the components using a system bus and may include one or more predetermined bus structures including a local bus.

The processor module 210 may be implemented using at least one of application specific integrated circuits (ASICs), digital signal processors (DSPs), digital signal processing devices (DSPDs), programmable logic devices (PLDs), field programmable gate arrays (FPGAs), controllers, micro-controllers, microprocessors, and electric units for performing other functions.

It was described above that the virtual fitting server 200 according to an embodiment of the present disclosure performs the functional operations described above, but, depending on the embodiments, an external device (e.g., the terminal 100, etc.) may perform at least some of the functional operations that the virtual fitting server 200 performs, or the virtual fitting server 200 may further perform at least some of functional operations that the external device performs, that is, various embodiments may be possible.

Method of Virtual Fitting Based on a Video Meeting Program

Hereafter, a method in which the fitting application 111, which is executed by at least one or more processors of the terminal 100 according to an embodiment of the present disclosure, performs virtual fitting based on a video meeting program is described in detail with reference to FIGS. 3 to 10.

In an embodiment of the present disclosure, at least one or more processors of the terminal 100 can execute at least one or more fitting application 111 stored in at least one or more memories 110 can operate the at least one or more fitting application 111 in a background state.

Hereafter, the configuration in which the at least one or more processors perform the method of providing a video meeting-based virtual fitting service described above by operating to execute commands of the fitting application 111 is briefly described as that the fitting application 111 performs the method.

FIG. 3 is a flowchart illustrating a method of virtual fitting based on a video meeting program according to an embodiment of the present disclosure.

Referring to FIG. 3, in an embodiment, a fitting application 111 that is executed or operated in a background state by at least one or more processors of the terminal 110 can execute a video meeting program (S101).

FIG. 4 is an example showing a video meeting interface according to an embodiment of the present disclosure.

Referring to FIG. 4, the video meeting program according to an embodiment may mean a system that supports communication between remote users using voices, characters, images, and/or pictures on the basis of communication between terminals 100 at remote places.

In an embodiment, the video meeting program can provide a video meeting interface 1 including at least one participant picture of at least one user attending a corresponding video meeting.

The participant picture according to an embodiment may include a main-participant picture 10 of a user attending the video meeting and at least one other-participant picture 20 (21, 22, 23, 24, 25, . . . ) of at least one other user.

In detail, in an embodiment, the fitting application 111 can read out a predetermined driving program constructed to perform the video meeting program described above from the memory 110.

The fitting application 111 can perform the video meeting program in accordance with the read-out predetermined driving program.

In an embodiment, the fitting application 111 can determine a virtual fitting garment based on the executed video meeting program (S103).

The virtual fitting garment according to an embodiment may mean the image of a predetermined garment that is intended to be put on a user in the main-participant picture 10 described above.

FIG. 5 is a flowchart illustrating a method of determining a virtual fitting garment according to an embodiment of the present disclosure and FIG. 6 is a conceptual diagram illustrating the method of determining a virtual fitting garment according to an embodiment of the present disclosure.

In detail, referring to FIGS. 5 and 6, in an embodiment, the fitting application 111 1) can acquire at least one other-participant picture 20 (S201).

That is, the fitting application 111 can acquire at least one other-participant picture 20 of at least one other user attending the video meeting.

In this case, as an embodiment, the fitting application 111 can decode and acquire the other-participant picture 20 in the unit of frame.

The decoded frames each may be a predetermined still picture image, for example, a 1280*720 RGB image.

In the embodiment, the fitting application 111 2) can extract a garment characteristic parameter value in the acquired other-participant picture 20 (S203).

The garment characteristic parameter value according to an embodiment may mean a parameter that can specific the shape of a garment (in an embodiment, a top) that another user in the other-participant picture 20 wears.

In an embodiment, the garment characteristic parameter may include parameters of a color, the kind of a pattern, the kind of a neckline, and/or a sleeve length.

That is, in an embodiment, the garment characteristic parameter value may mean a set of data values acquired for the garment characteristic parameters described above, respectively.

FIG. 7 is an exemplary diagram illustrating human parsing according to an embodiment of the present disclosure.

In detail, referring to FIG. 7, in an embodiment, the fitting application 111 can perform human parsing based on the other-participant picture 20.

The fitting application 111 according to an embodiment can perform the human parsing on the basis of well-known algorithms (e.g., a human parsing deep learning algorithm, etc.), etc., and the method and/or the algorithm itself that performs the human parsing is not limited in an embodiment of the present disclosure.

The fitting application 111 can perform the human parsing on each of at least one frame in the other-participant picture 20 decoded in the unit of frame.

In an embodiment, the fitting application 111 can extract a plurality of pixels forming the region of the garment that another user in the other-participant picture 20 wears on the basis of the result of the human parsing.

FIG. 8 is a diagram showing an example of an other-participant garment image according to an embodiment of the present disclosure.

Referring to FIG. 8, in an embodiment, the fitting application 111 can acquire the image of the garment that another user in the other-participant picture 20 wears (hereafter, an other-participant garment image 30) on the basis of the extracted plurality of pixels.

In the embodiment, the fitting application 111 can extract the garment characteristic parameter value in the acquired other-participant garment image 30.

That is, the fitting application 111 can extract a garment characteristic parameter value that can specify the shape of the garment that the another user wears by performing image analysis on the other-participant garment image 30 acquired as described above.

In an embodiment, the fitting application 111 3) can determine a clothing category corresponding to the garment image on the basis of the extracted garment characteristic parameter value (S205).

In an embodiment, the clothing category according to an embodiment may mean a preset classification category according to the properties of predetermined garments.

For example, the clothing category may include t-shirt, a long sleeve shirt, a sleeveless shirt, a shift, and/or a sweater. As another example, the clothing category may include tailored garment, accessory, casual wear, and/or sports wear categories.

In detail, in an embodiment, the fitting application 111 can determine at least one clothing category corresponding to each other-participant garment image 30 in the at least one other-participant picture 20 on the basis of at least one garment characteristic parameter value extracted on the basis of the at least one other-participant picture 20.

As an embodiment, the fitting application 111 can determine clothing categories corresponding to the garment characteristic parameter values on the basis of classification based on a Convolutional Neural Network (CNN) such as Resnet, AlexNet, and/or VGGNet. However, the present disclosure is not limited thereto, any algorithm and/or process may be included in an embodiment of the present disclosure as long as it can determine a clothing category of a corresponding garment using the garment characteristic parameter value.

For example, when first to third other users attend the remote meeting, the fitting application 111 can determine a first clothing category (e.g., a t-shirt, etc.) corresponding to the property of a garment, which the first other participant wears, on the basis of a first garment characteristic parameter value (in an embodiment, a color, the kind of a pattern, the kind of a neckline, and/or a sleeve length) extracted on the basis of a first other-participant picture 20.

In the embodiment, the fitting application 111 can determine a second clothing category (e.g., a t-shirt, etc.) corresponding to the property of a garment, which the second other participant wears, on the basis of a second garment characteristic parameter value extracted on the basis of a second other-participant picture 20.

Similarly, in the embodiment, the fitting application 111 can determine a third clothing category (e.g., a long sleeve shirt, etc.) corresponding to the property of a garment, which the third other participant wears, on the basis of a third garment characteristic parameter value extracted on the basis of a third other-participant picture 20.

In an embodiment, the fitting application 111 4) can determine a dress code on the basis of the determined clothing category (S207).

In an embodiment, the dress code, which is information generally showing the style, formality, shape, and/or color of garments in a corresponding video meeting, may mean a clothing category set for the virtual fitting garment described in the above embodiment.

That is, in an embodiment, the dress code may be a clothing category into which the image of a garment (hereafter, a user garment image), which is intended to be put on the user in the main-participant picture 10 described above, is classified.

In detail, in an embodiment, the fitting application 111 can determine the dress code on the basis of the appearance frequency of the at least one determined clothing category.

As an embodiment, the fitting application 111 can determine the most appearing clothing category having the highest appearance frequency as the dress code.

For example, when the first clothing category is a 't-shirt', the second clothing category is a 't-shirt', and the third clothing category is a 'long sleeve shirt', the fitting application 111 can determine the clothing category of the 't-shirt', which is the clothing category having the highest appearance frequency (appearing twice in the embodiment), as the dress code.

In an embodiment, when there is a plurality of the most appearing clothing categories (e.g., when the first clothing category (e.g., a t-shirt) appears once, the second clothing category (e.g., a long sleeve shirt) appears once, and the third clothing category (e.g., a sleeveless shirt) appears once), the fitting application 111 may freely select and determine one clothing category of the at least one category as the dress code.

In this way, the fitting application 111 determines a clothing category (e.g., a t-shirt, etc.) to which the most of the garments, which at least one other user attending a corresponding video meeting wear, belong as the dress code, whereby the fitting application 111 can determine the virtual fitting garment by detecting clothing having the same characteristics as the garments that the at least one other user wears.

In an embodiment, the fitting application 111 5) can detect at least one candidate fitting garment on the basis of the determined dress code and/or a garment characteristic parameter value (S209).

The candidate fitting garment according to an embodiment may mean a garment image extracted in correspondence to the dress code and/or the garment characteristic parameter value from a plurality of garment images (hereafter, database images) classified and stored in accordance with the clothing categories.

In detail, in an embodiment, the fitting application 111 1) can detect at least one candidate fitting garment on the basis of the dress code.

In more detail, the fitting application 111 can detect at least one garment image of a plurality of garment images classified and stored in advance as the clothing category to which the dress code belongs, as the candidate fitting garment.

For example, when the dress code belongs to the first clothing category (e.g., a t-shirt), the fitting application 111 can detect at least one garment image of a plurality of garment images classified and stored as the first clothing category as the candidate fitting garment.

Accordingly, the fitting application 111 can determine a garment image, which is the same kind as the garments that most other users wear in a corresponding video meeting, as the candidate fitting garment.

In another embodiment, the fitting application 111 2) can detect at least one candidate fitting garment on the basis of the at least one garment characteristic parameter value.

In detail, the fitting application 111 can acquire an integrated characteristic parameter value based on the at least one garment characteristic parameter value.

The integrated characteristic parameter value according to an embodiment may mean a garment characteristic parameter value created by detecting a data value having the highest appearance frequency (hereafter, a most appearing data value) of the data value of each of at least one garment characteristic parameter, which the at least one garment characteristic parameter value shows, and the integrating the detected most appearing data values of the garment characteristic parameter.

For example, when a first garment characteristic parameter (e.g., a color) data value is 'black', a second garment characteristic parameter (e.g., the kind of a pattern) data value is 'plain', a third garment characteristic parameter (e.g., the kind of a neckline) data value is 'round', and a fourth garment characteristic parameter (e.g., a sleeve length) data value is 10 cm in a predetermined first garment characteristic parameter value; when the first garment characteristic parameter (e.g., a color) data value is 'black', the second garment characteristic parameter (e.g., the kind of a pattern) data value is 'plain', the third garment characteristic parameter (e.g., the kind of a neckline) data value is 'round', and the fourth garment characteristic parameter (e.g., a sleeve length) data value is 10 cmm in a predetermined second garment characteristic parameter value; and when the first garment characteristic parameter (e.g., a color) data value is 'white', the second garment characteristic parameter (e.g., the kind of a pattern) data value is 'checked', the third garment characteristic parameter (e.g., the kind of a neckline) data value is 'round', and the fourth garment characteristic parameter (e.g., a sleeve length) data value is 10 cmm in a predetermined third garment characteristic parameter value, the fitting application 111 may acquire an integrated characteristic parameter value in which the first garment characteristic parameter (e.g., a color) data value is 'black', the second garment characteristic parameter (e.g., the kind of a pattern) data value is 'plain', the third garment characteristic parameter (e.g., the kind of a neckline) data value is 'round', and the fourth garment characteristic parameter (e.g., a sleeve length) data value is 10 cm.

That is, the fitting application 111 can create an integrated characteristic parameter value that represents the at least one garment characteristic parameter value on the basis of the data values having the highest appearing frequency in respective garment characteristic parameters in the at least one garment characteristic parameter value.

The fitting application 111 can compare the integrated characteristic parameter value created as described above with the characteristic parameter value of each of the database images.

Through the comparison, the fitting application 11 can extract at least one garment image having a garment characteristic parameter value corresponding to the integrated characteristic parameter value over a predetermined coincidence ratio from the database images, and can determine the at least one garment image as the candidate fitting garment.

Accordingly, the fitting application 111 can determine a garment image more minutely corresponding to characteristics, such as the color, the kind of the pattern, the kind of the neckline, and/or a sleeve length, of the garments, which most other users in a corresponding video meeting wear, as the candidate fitting garment.

In another embodiment, the fitting application 111 3) can detect at least one candidate fitting garment on the basis of the dress code and the one or more garment characteristic parameter value.

In detail, the fitting application 111 can extract at least one garment image having a garment characteristic parameter value corresponding to the integrated characteristic parameter from a plurality of garment images classified and stored as a clothing category to which the dress code belongs, and can determine the least one garment image as the candidate fitting garment.

That is, the fitting application 111 can determine a garment image, which minutely corresponds to characteristics such as the color, the kind of the pattern, the kind of the neckline, and/or the sleeve length of the garments that most other users in a corresponding video meeting wear, of garment images that are the same kind as the garments that the most other users wear as the candidate fitting garment, thereby being able to determine a garment image more accurately and closely corresponding to the dress code of the video meeting as the candidate fitting garment.

In an embodiment, the fitting application 111 6) can determine a virtual fitting garment on the basis of the detected at least one candidate fitting garment (S211).

In other words, the virtual fitting garment may mean the image of a predetermined garment that is intended to be put on a user in the main-participant picture 10 described above.

In detail, in an embodiment, the fitting application 111 1) can determine the virtual fitting garment on the basis of the user input.

In more detail, the fitting application 111 can provide a virtual fitting garment selection interface that can select one of the detected at least one candidate fitting garment.

The fitting application 111 can determine a candidate fitting garment (hereafter, a user selecting fitting garment) selected on the basis of user input based on the provided interface as the virtual fitting garment.

In this case, depending on embodiments, the fitting application 111 may provide a parameter adjustment interface that can change the garment characteristic parameter value of the user selecting fitting garment.

In detail, the fitting application 111 may provide a parameter adjustment interface that a user interface being able to change parameter values of the color, the kind of the pattern, the kind of the neckline, and/or the sleeve length of the user selecting fitting garment.

The fitting application 111 can change the garment characteristic parameter value of the user selecting fitting garment in accordance with user input based on the provided parameter adjustment interface.

For example, the fitting application 111, in accordance with user input based on the parameter adjustment interface, can change 'black' to 'red' of the color parameter value of the user selecting fitting garment, 'plain' to 'checked' of the pattern kind parameter value, 'round' to 'v-shaped' of the neck line parameter value, and '10 cm' to '5 cm' of the sleeve length parameter value.

The fitting application 111 can determine the user selecting fitting garment having garment characteristic parameter values changed as described above as the virtual fitting garment.

Accordingly, the fitting application 111 can provide a custom-fit virtual fitting garment having a type that satisfies the dress code of a corresponding video meeting and a user wants.

In an embodiment, the fitting application 111 2> can determine the virtual fitting garment on the basis of the integrated characteristic parameter value.

In detail, the fitting application 111 can acquire a coincidence ratio between the integrated characteristic parameter value and the garment characteristic parameter value of at least one candidate fitting garment.

The fitting application 111 can determine a candidate fitting garment of which the acquired coincidence ratio is the highest as the virtual fitting garment.

In another embodiment, the fitting application 111 can determine the virtual fitting garment on the basis of a virtual wearing computing amount.

The virtual wearing computing amount according to an embodiment may include a data processing amount and/or a data processing time required for a central processing unit (CPU) and/or a graphic processing unit (GPU) when performing a virtual wearing process to be descried below.

In detail, the fitting application 111 can determine a candidate fitting garment having a minimum virtual wearing computing amount of the at least one candidate fitting garment.

As an embodiment, the fitting application 111 can determine a candidate fitting garment having the minimum virtual wearing computing amount on the basis of a garment characteristic parameter value (in an embodiment, parameter values of a color, a the kind of a pattern, the kind of a neckline, and/or a sleeve length) of each of at least one candidate fitting garment.

For example, the fitting application 111 can determine a candidate fitting garment having the kind of a pattern (e.g., plain, etc.) and a sleeve length (e.g., 0 cm, etc.) that minimize the virtual wearing computing amount.

As another embodiment, the fitting application 111 may detect a candidate fitting garment having the minimum virtual wearing computing amount by performing virtual wearing simulation using a predetermined simulator.

In detail, the fitting application 111 can operate with the simulator that performs a predetermined virtual wearing simulation on the basis of the at least one candidate fitting garment and the main-participant picture 10.

The fitting application 111 can acquire a virtual wearing computing amount required for the virtual wearing simulation for each of the candidate fitting garments from the cooperating simulator.

The fitting application 111 can determine a candidate fitting garment having a minimum virtual wearing computing amount of the virtual wearing computing amount acquired from each of the candidate fitting garments as the virtual fitting garment.

As described above, the fitting application 111 can determine any one of the at least one candidate fitting garment as the virtual fitting garment in accordance with a predetermined method corresponding to needs of a user of the various methods described above.

Returning to FIG. 3, the fitting application 111 that has determined a virtual fitting garment, as described above, can create a virtual fitting picture on the basis of the determined virtual fitting garment (S105).

The virtual fitting picture according to an embodiment may mean a picture in which the user in the main-participant picture 10 described above virtually wears the determined virtual fitting garment.

FIG. 9 is an exemplary diagram illustrating a method of a virtual fitting picture according to an embodiment of the present disclosure.

In detail, referring to FIG. 9, in an embodiment, the fitting application 111 can acquire a main-participant picture 10 of a user attending the video meeting.

In this case, as an embodiment, the fitting application 111 can decode and acquire the main-participant picture 10 in the unit of frame.

The decoded frames each may be a predetermined still picture image, for example, a 1280*720 RGB image.

In an embodiment, the fitting application 111 can perform human parsing based on the main-participant picture 10 acquired as described above.

The fitting application 111 according to an embodiment can perform the human parsing on the basis of well-known algorithms, etc., and the method and/or the algorithm itself that performs the human parsing is not limited in an embodiment of the present disclosure.

The fitting application 111 can perform the human parsing on each of at least one frame in the main-participant picture 10 decoded in the unit of frame.

In an embodiment, the fitting application 111 can extract a plurality of pixels forming the region that the user in the main-participant picture 10 occupies and/or the region of a garment (in an embodiment, a top) that the user wears on the basis of the result of the human parsing.

In an embodiment, the fitting application 111 can perform a virtual fitting process that creates the virtual fitting picture 50 on the basis of the extracted plurality of pixels and the virtual fitting garment 40.

In detail, as an embodiment, the fitting application 111 can calculate pose data obtained by analyzing real-time poses of the user on the basis of a plurality of pixels forming the region that the user in the main-participant picture 10 occupies and/or the region of a garment (in an embodiment, a top) that the user wears.

The pose data according to an embodiment may mean data that can specify poses of the user in the main-participant picture 10 (e.g., a pose facing the front, a pose turned in a first direction, etc.).

In an embodiment, the pose data may include position information about predetermined joints and body part to be able to show postures of a user. However, the present disclosure is not necessarily limited thereto and the present disclosure may be implemented in various ways for example an identification number showing a pose corresponding to the current posture of a user of a plurality of predetermined poses is used as the pose data.

In more detail, the fitting application 111 can calculate body coordinate information of one or more body parts of the user on the basis of the plurality of pixels.

The body coordinate information according to an embodiment may mean data showing the positions of preset specific body parts (e.g., eyes, a nose, ears, a neck, shoulders, elbows, and/or wrists), respectively.

According to an embodiment, the fitting application can use a neural network circuit, etc. to calculate the body coordinate information, and the present disclosure may be implemented using various other methods.

The fitting application 111 can acquire the pose data on the basis of body coordinate information calculated as described above.

That is, the fitting application 111 can specific postures of a corresponding user, etc. using the calculated body coordinate information.

In an embodiment, the fitting application 111 can deform the virtual fitting garment 40 to be matched with the posture of a corresponding user on the basis of the acquired real-time pose data.

In detail, the fitting application 111 can deform the virtual fitting garment 40 to have a shape according to a posture of the user on the basis of at least one or more items of body coordinate information about the pose data and at least one or more clothes coordinate information about the virtual fitting garment 40.

The clothes coordinate information according to an embodiment may mean data showing the positions of specific clothes parts (e.g., a shoulder line, a collar band, a collar, a sleeve seam, and/or a sleeve end), respectively, for a predetermined garment image.

In more detail, the fitting application 111 can match components of the body coordinate information (hereafter, body coordinate components) and components of corresponding clothes coordinate information (hereafter, clothes coordinate components) to correspond to each other, respectively.

The fitting application 111 can match the body coordinate components and the clothes coordinate components to each other by changing the coordinate values of the clothes coordinate components to correspond to the coordinate values of the body coordinate components.

On the basis of the components, the fitting application 111 can change the direction, inclination, bending, shape, color, and/or length of the virtual fitting garment 40 to have a shape corresponding to a posture of the user.

For example, the fitting application 111 can match the clothes coordinate information corresponding to the left shoulder line of a first virtual fitting garment 40 to body coordinate information corresponding to the left shoulder of a first user, can match the clothes coordinate information corresponding to the left shoulder line of the first virtual fitting garment 40 to body coordinate information corresponding to the right shoulder of the first user, and in this process, can change the direction, inclination, bending, shape, color, and/or length of the first virtual fitting garment 40.

Accordingly, the fitting application 111 can virtually put the virtual fitting garment 40 on the user more accurately and naturally to fit the posture of the user.

In an embodiment, the fitting application 111 can create the virtual fitting picture 50 by virtually putting the virtual fitting garment 40, which has been deformed in real time to fit the posture of a user, as described above, on the user in the main-participant picture 10.

In detail, the fitting application 111 can virtually put the virtual fitting garment 40 that is deformed in real time to fit the posture of a user (hereafter, a real-time virtual fitting garment 40) on the user on the basis of a plurality of pixels forming the region of the garment (in an embodiment, a top) that the user in the main-participant picture 10 wears.

As an embodiment, the fitting application 111 can virtually put the real-time virtual fitting garment 40 on the user by outputting the real-time virtual fitting garment 40 on the basis of the plurality of pixels.

Accordingly, the fitting application 111 can create a virtual fitting picture 50 in which the user in the main-participant picture 10 wears the determined virtual fitting garment 40.

In an embodiment, the fitting application 111 can provide the virtual fitting picture 50 created as described above (S107).

FIG. 10 is a diagram showing an example of providing a virtual fitting picture according to an embodiment of the present disclosure on the basis of a video meeting interface 1.

In detail referring to FIG. 10, in an embodiment, the fitting application 111 can provide the created virtual fitting picture 50 to at least one user attending a corresponding video meeting (that is, to the terminal 100 of at least one user attending a corresponding video image) by transmitting the created virtual fitting picture 50 through the video meeting interface 1 of the video meeting program.

As described above, the fitting application 111 determines a predetermined garment image corresponding to the dress code and/or a characteristic parameter value of the garment, which most other users attending a corresponding video meeting wear, as a virtual fitting garment 40 to virtually put on a user attending the video meeting, and creates and provides a virtual fitting picture 50 that is a main-participant picture 10 showing the user wearing the determined virtual fitting garment 40, thereby being able to perform remote communication while sharing the picture of the user wearing a garment suitable for the characteristic or the atmosphere of the video meeting.

As described above, the method and system for virtual fitting based on a video meeting program according to an embodiment of the present disclosure detect a virtual garment image corresponding to the clothing, which at least one other user attending a video meeting wears, and virtually putting the detected virtual garment image on a user attending the video meeting, whereby there is an effect that it is possible to provide a picture of the user wearing clothing, which satisfies a dress code suitable for the characteristic or the atmosphere of the video meeting, through the video meeting program.

Further, the method and system for virtual fitting based on a video meeting program according to an embodiment of the present disclosure find out a dress code for a video meeting on the basis of the clothing of at least one other user attending the video meeting, and then automatically virtually puts virtual clothing corresponding to the dress code on a user, whereby there is an effect that it is possible to minimize the inconvenience that the user has to change in order to attend the video meeting in the middle of working from home in comfortable dress or the user has to wear different suitable clothes, depending on the characteristic or the atmosphere of the video meetings that he/she attends.

Further, the method and system for virtual fitting based on a video meeting program according to an embodiment of the present disclosure determine a dress code of a video meeting on the basis of the clothing that at least one other user attending the video meeting wears, and virtually puts virtual clothing that satisfies the determined dress code on a user, whereby there is an effect that it is possible to reduce the time or costs that a user who intends to attend a video meeting uses to determine his/her clothing attitude and it is possible to increase usability of a video meeting program.

Embodiments of the present disclosure described above may be implemented in the type of program commands the can be executed through various computer components, and may be recorded on a computer-readable recording medium. The computer-readable recording medium may include program commands, data files, and data structures individually or in combinations thereof. The program commands that are recorded on a computer-readable recording medium may be those specifically designed and configured for the present invention or may be those available and known to those engaged in computer software in the art. The computer-readable recording medium includes magnetic media such as hard disks, floppy disks, and magnetic media such as a magnetic tape, optical media such as CD-ROMs and DVDs, magneto-optical media such as floptical disks, and hardware devices specifically configured to store and execute program commands, such as ROM, RAM, and flash memory. The program commands include not only machine language codes compiled by a compiler, but also high-level language code that can be executed by a computer using an interpreter etc. A hardware device may be changed into one or more software modules to perform the processes according to the present disclosure, and vice versa.

What is claimed is:

1. A method for performing virtual fitting for a user based on a video meeting program by a fitting application executed by at least one processor of a terminal, the method comprising:
acquiring at least one other-participant picture of another user attending a video meeting through the video meeting program;
acquiring a garment characteristic parameter value specifying a shape of a garment worn by the another user in the acquired other-participant picture;
determining one clothing category, into which the garment worn by the another user is classified, among a plurality of clothing categories based on the acquired garment characteristic parameter value;
determining a dress code for the video meeting based on the determined clothing category;
detecting at least one candidate fitting garment based on the determined dress code and the acquired garment characteristic parameter value;
determining a virtual fitting garment which is a garment image intended to be virtually put on the user attending the video meeting through the video meeting program based on the detected candidate fitting garment;
creating a virtual fitting picture in which a main-participant picture of the user provided in the video meeting program is modified such that the user virtually wears the determined virtual fitting garment; and
outputting the created virtual fitting picture,
wherein the determining of the virtual fitting garment includes determining, as the virtual fitting garment, a candidate fitting garment having a lowest computing amount for processing virtual wearing to the user among the at least one candidate fitting garment, wherein a computing amount for the virtual wearing comprises at least one of a data processing amount and a data processing time for processing the virtual wearing to the user.

2. The method of claim 1, wherein the garment characteristic parameter value includes a data value of each of garment characteristic parameters including at least one of a color, a kind of a pattern, a kind of a neckline, and a sleeve length of a predetermined garment.

3. The method of claim 1, wherein the determining of the dress code includes determining the dress code based on an appearance frequency of each of the clothing categories.

4. The method of claim 1, wherein the detecting of the candidate fitting garment includes detecting, as the candidate fitting garment, at least one garment image of a plurality of garment images, which is classified and stored as the one clothing category matched with the determined dress code.

5. The method of claim 2, wherein the detecting of the candidate fitting garment includes:
creating an integrated characteristic parameter value integrating most appearing data values of the garment characteristic parameters in the at least one garment characteristic parameter value;
comparing the created integrated characteristic parameter value with garment characteristic parameter values of a plurality of garment images pre-stored in a database, respectively; and
determining, as the candidate fitting garment, at least one garment image having a garment characteristic parameter value satisfying a predetermined concordance ratio to the integrated characteristic parameter value.

6. The method of claim 5, wherein the detecting of the candidate fitting garment includes detecting at least one garment image, which has a garment characteristic parameter value satisfying a predetermined concordance ratio to the integrated characteristic parameter value of a plurality of garment images classified and stored as a clothing category matched with the dress code, as the candidate fitting garment.

7. The method of claim 1, wherein the determining of the virtual fitting garment includes determining the virtual fitting garment based on a user input of selecting one of the at least one candidate fitting garment.

8. The method of claim 7, wherein the determining of the virtual fitting garment further includes:
providing a parameter adjustment interface changing the garment characteristic parameter value of the one of the at least one candidate fitting garment selected based on the user input;
changing the garment characteristic parameter value of the one of the at least one candidate fitting garment selected based on the user input based on the provided parameter adjustment interface; and
determining a candidate fitting garment having the changed garment characteristic parameter value as the virtual fitting garment.

9. The method of claim 5, wherein the determining of the virtual fitting garment includes determining a candidate fitting garment, which has a garment characteristic parameter value having a highest concordance ratio to the integrated characteristic parameter value of the at least one candidate fitting garment, as the virtual fitting garment.

10. The method of claim 1, wherein the outputting of the created virtual fitting picture includes outputting the created virtual fitting picture to at least one terminal of at least one other user attending the video meeting through the video meeting program and the terminal of the user by transmitting the created virtual fitting picture through the video meeting program.

11. A system for performing virtual fitting for a user based on a video meeting program, the system comprising:
one or more displays configured to output a virtual fitting picture;
one or more memories; and
one or more processors,
wherein at least one application stored in the one or more memories and performing the virtual fitting based on the video meeting program by being executed by the one or more processors is configured to:
acquire at least one other-participant picture of another user attending a video meeting through the video meeting program,
acquire a garment characteristic parameter value specifying a shape of a garment worn by the another user in the acquired other-participant picture,
determine one clothing category, into which the garment worn by the another user is classified, among a plurality of clothing categories based on the acquired garment characteristic parameter value,
determine a dress code for the video meeting on the basis of the determined clothing category,
detect at least one candidate fitting garment based on the determined dress code and the acquired garment characteristic parameter value,
determine a virtual fitting garment which is a garment image intended to be virtually put on the user attending the video meeting through the video meeting program based on the detected candidate fitting garment by determining, as the virtual fitting garment, a candidate fitting garment having a lowest computing amount for processing virtual wearing to the user among the at least one candidate fitting garment, wherein a computing amount for the virtual wearing comprises at least one of a data processing amount and a data processing time for processing the virtual wearing to the user, create the virtual fitting picture in which a main-participant picture of the user provided in the video meeting program is modified such that the user virtually wears the determined virtual fitting garment, and output the created virtual fitting picture.

* * * * *